United States Patent
Kline et al.

(10) Patent No.: US 10,739,726 B2
(45) Date of Patent: Aug. 11, 2020

(54) AUDIO MANAGEMENT FOR HOLOGRAPHIC OBJECTS

(71) Applicant: International Business Machines Corporation, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 122 days.

(21) Appl. No.: 16/151,265

(22) Filed: Oct. 3, 2018

(65) Prior Publication Data

US 2020/0110360 A1    Apr. 9, 2020

(51) Int. Cl.
*G03H 1/00* (2006.01)
*B64C 39/02* (2006.01)
*H04S 7/00* (2006.01)

(52) U.S. Cl.
CPC ......... *G03H 1/0005* (2013.01); *B64C 39/024* (2013.01); *H04S 7/303* (2013.01); *B64C 2201/12* (2013.01); *B64C 2201/141* (2013.01)

(58) Field of Classification Search
CPC ............... G03H 1/0005; G03H 1/2249; G03H 2226/05; G03H 2001/2242; G03H 2210/30; G03H 2001/0088; G03H 2210/62; B64C 39/024; B64C 2201/12; B64C 2201/141; H04S 7/303; G06T 19/006; G06T 7/20; G10K 2210/1281; G10K 2210/3215; G10K 11/17821; G10K 11/17857; G10K 11/1781; G10K 2210/103; G02B 30/56
See application file for complete search history.

(56) References Cited

U.S. PATENT DOCUMENTS

| 6,199,655 | B1 | 3/2001 | Norris |
| 9,035,955 | B2 | 5/2015 | Keane et al. |
| 9,442,496 | B1* | 9/2016 | Beckman ............... G06N 20/00 |
| 9,544,696 | B2 | 1/2017 | Poupyrev et al. |
| 10,231,073 | B2* | 3/2019 | Stein .................... G10L 19/167 |
| 10,284,994 | B2* | 5/2019 | Alexandropoulos ... H04S 3/002 |

(Continued)

FOREIGN PATENT DOCUMENTS

| WO | 2016166366 A1 | 10/2016 |
| WO | 2016171160 A1 | 10/2016 |

OTHER PUBLICATIONS

Huang et al.; "WalkieLokie: Relative Positioning for Augmented Reality Using a Dummy Acoustic Speaker"; arXiv:1508.05477v1 [cs.CY]; Aug. 22, 2015; pp. 1-15.

(Continued)

*Primary Examiner* — Collin X Beatty
(74) *Attorney, Agent, or Firm* — Cantor Colburn LLP; Tihon Poltavets (57) ABSTRACT

Synchronizing of perceived sound with a moving holographic object. When a holographic object is generated in a first position, an autonomous aerial vehicle (AAV) is positioned such that a speaker coupled to the AAV generates sound perceived to come from the holographic object in the first position. When the holographic object is generated in a second position, flight of the AAV is utilized to synchronize the AAV with the holographic object such that the sound generated from the speaker is perceived to come from the holographic object in the second position.

20 Claims, 6 Drawing Sheets

(56) References Cited

U.S. PATENT DOCUMENTS

| | | | |
|---|---|---|---|
| 10,366,542 B2* | 7/2019 | Lehtiniemi | H04S 7/303 |
| 10,511,906 B1* | 12/2019 | Moore | H04S 7/301 |
| 10,536,783 B2* | 1/2020 | Sanger | H04R 25/407 |
| 2011/0007277 A1* | 1/2011 | Solomon | G02B 26/105 |
| | | | 353/7 |
| 2013/0022222 A1* | 1/2013 | Zschau | G03H 1/2202 |
| | | | 381/306 |
| 2013/0223658 A1* | 8/2013 | Betlehem | H04R 5/02 |
| | | | 381/307 |
| 2014/0204077 A1* | 7/2014 | Kamuda | A63F 13/655 |
| | | | 345/419 |
| 2014/0219455 A1 | 8/2014 | Peters et al. | |
| 2014/0313225 A1* | 10/2014 | Lee | G06T 19/006 |
| | | | 345/633 |
| 2016/0032795 A1 | 2/2016 | Yahagi et al. | |
| 2016/0212538 A1 | 7/2016 | Fullam et al. | |
| 2016/0260441 A1* | 9/2016 | Muehlhausen | G06F 3/011 |
| 2017/0053042 A1* | 2/2017 | Sugden | H04N 5/23229 |
| 2018/0018894 A1* | 1/2018 | Coulson, Sr. | G09B 5/06 |
| 2018/0034867 A1* | 2/2018 | Zahn | G06F 3/0487 |
| 2019/0333494 A1* | 10/2019 | Park | H04R 1/406 |
| 2019/0388765 A1* | 12/2019 | Bostick | A63B 69/002 |
| 2020/0005615 A1* | 1/2020 | Madden | G08B 13/19608 |
| 2020/0026257 A1* | 1/2020 | Dalal | G06N 5/02 |

OTHER PUBLICATIONS

Ishiguro et al.; "Ubisonus: Spatial Freeform Interactive Speakers"; Disney Research Pittsburgh; UIST'14 Adjunct; Oct. 5-8, 2014; pp. 67-68.

* cited by examiner

AUDIO MANAGEMENT FOR HOLOGRAPHIC OBJECTS

BACKGROUND

The invention relates generally to holographic objects, and more particularly, to managing the audio associated with a particular holographic object.

Today the technology exists for generating 3D interactive holograms. For example, a speaker providing a presentation to a live audience may be a holographic person. Thus, holographic projection systems can project 3D digital objects into midair. The holographic image can be seen without any glass and can be animated such that the object moves from one place to another place.

Animated themes may be created where some holographic objects represent humans while some other holographic objects represent non-humans. Sound design is a factor in making an animated theme interesting and authentic. Existing systems today can create some degree of directional sound. However, when users become directly interactive with animated holographic objects, it will no longer be practical because of the distance to utilize known directional sound systems for making sound appear that it is coming directly from a holographic object.

SUMMARY

According to a non-limiting embodiment, a method for synchronizing sound with a moving holographic object is provided. The method includes generating a holographic object in a first position and then positioning at least one autonomous aerial vehicle (AAV) having at least one speaker such that the speaker generates sound perceived to come from the holographic object in the first position. The method also includes generating the holographic object in the second position and then, via flight of the AAV, synchronizing the AAV with the holographic object such that the sound generated from the speaker is perceived to come from the holographic object in the second position.

According to another non-limiting embodiment, a system for synchronizing sound with moving holographic objects is provided. The system includes at least a first holographic system having a projector projecting a first holographic object in a first position and subsequently projecting the first holographic object in a second position. The system also includes at least a first autonomous aerial vehicle (AAV) having a speaker generating sound for holographic objects wherein the first AAV is in communication with the first holographic system for determining the positioning of the first holographic object. Also, the positioning of the first AAV via flight synchronizes the speaker of the AAV in the first and second positions such that sound is perceived to come from the first holographic object when in each of the first and second positions. The system may also include positioning the first AAV to mirror the movement of the first holographic object between the first and second positions. Also, the first AAV may fly into the first holographic object at the first and second positions.

According to yet another non-limiting embodiment, a computer program product is provided. The computer program product includes a computer readable storage medium having program instructions embodied therewith, the program instructions executable by a computer processor to cause the computer processor to perform a method. The method includes generating via a holographic system a holographic object in a first position and communicating with at least one autonomous aerial vehicle (AAV) to generate sound perceived to be from the holographic object in the first position. The method then includes generating the holographic object in a second position and, in response to the holographic object being projected in the second position, repositioning the AAV via flight and generating sound perceived to be from the holographic object in the second position.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, modern holographic techniques allow for a holographic object to be generated by a computer system coupled to and controlling a holographic system. The holographic system includes a holographic apparatus having a holographic projector. Although the holographic object may be nearly indistinguishable from real objects, the audio associated with the generated holographic object may be misplaced in that the audio comes from a speaker at a distant location relative to the holographic object.

As described herein, one or more embodiments address shortcomings of the prior art by providing a computer system capable of providing audio synchronized with the generated holographic object. Also, as the generated holographic object moves from one position to another, the source of the audio mirrors or tracks the movement of the holographic object.

Figure 1:
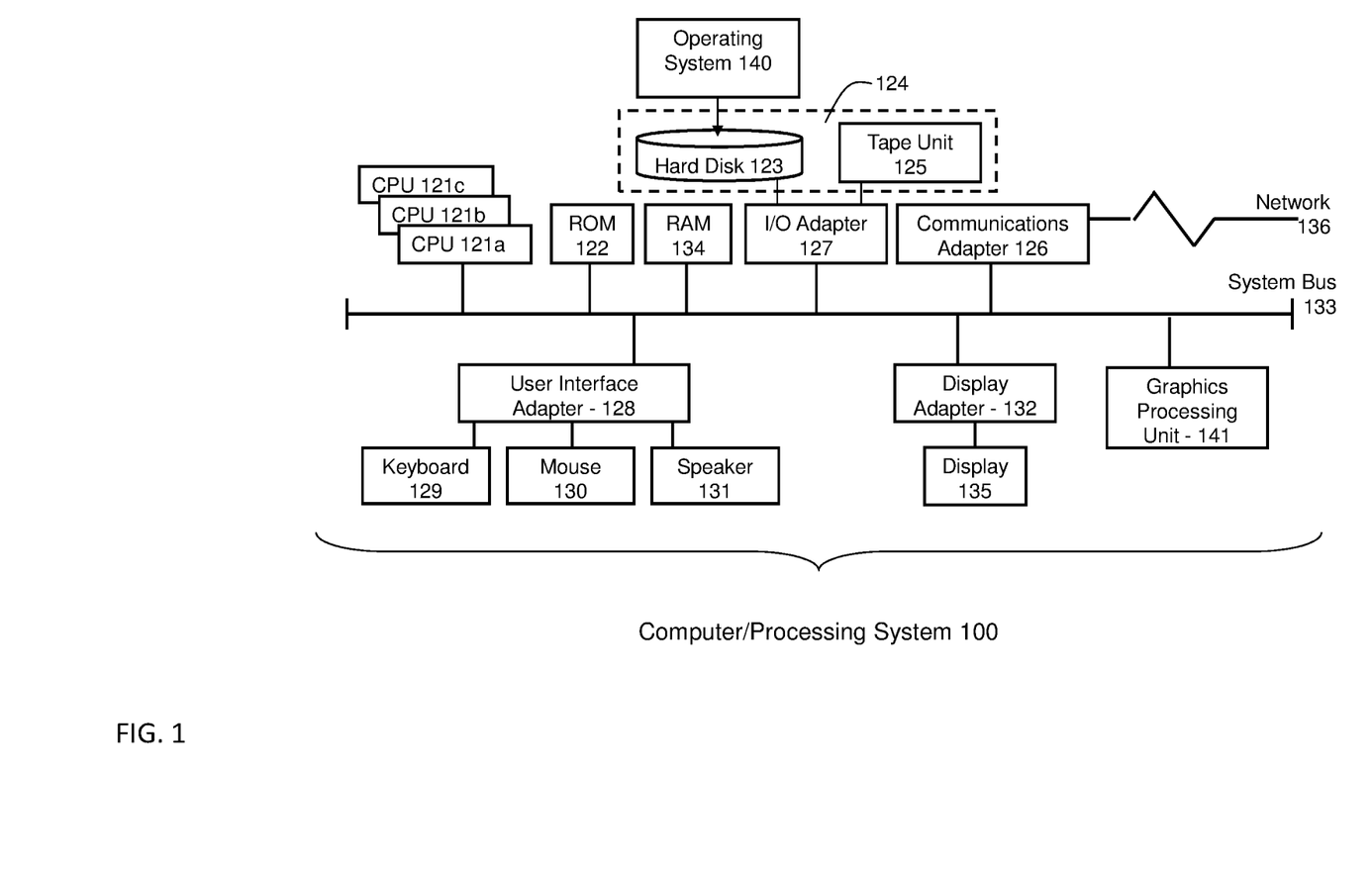
FIG. 1 depicts a block diagram illustrating an exemplary computer processing system that may be utilized to implement exemplary embodiments of the present invention.

Referring to FIG. 1, there is shown an embodiment of a processing system, commonly referred to as a computer system 100, configured as a personal computer for implementing the teachings herein. In this embodiment, the computer system 100 has one or more central processing units (processors) 121a, 121b, 121c, etc. (collectively or generically referred to as processor(s) 121). In one or more embodiments, each processor 121 may include a reduced instruction set computer (RISC) microprocessor. Processors 121 are coupled to system memory 134 and various other components via a system bus 133. Read only memory (ROM) 122 is coupled to the system bus 133 and may include a basic input/output system (BIOS), which controls certain basic functions of computer system 100.

FIG. 1 further depicts an input/output (I/O) adapter 127 and a network adapter 126 coupled to the system bus 133. I/O adapter 127 may be a small computer system interface (SCSI) adapter that communicates with a hard disk 123 and/or tape storage drive 125 or any other similar component. I/O adapter 127, hard disk 123, and tape storage device 125 are collectively referred to herein as mass storage 124. Operating system 140 for execution on the processing system 100 may be stored in mass storage 124. A network adapter 126 interconnects bus 133 with an outside network 136 enabling the computer system 100 to communicate with other such systems. A screen (e.g., a display monitor) 135 is connected to system bus 133 by display adaptor 132, which may include a graphics adapter to improve the performance of graphics intensive applications and a video controller. In one embodiment, adapters 127, 126, and 132 may be connected to one or more I/O busses that are connected to system bus 133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 133 via user interface adapter 128 and display adapter 132. A keyboard 129, mouse 130, and speaker 131 all interconnected to bus 133 via user interface adapter 128, which may include, for example, a Super I/O chip integrating multiple device adapters into a single integrated circuit.

In exemplary embodiments, the computer system 100 includes a graphics processing unit 141. Graphics processing unit 141 is a specialized electronic circuit designed to manipulate and alter memory to accelerate the creation of images in a frame buffer intended for output to a display. In general, graphics processing unit 141 is very efficient at manipulating computer graphics and image processing and has a highly parallel structure that makes it more effective than general-purpose CPUs for algorithms where processing of large blocks of data is done in parallel.

Thus, as configured in FIG. 1, the computer system 100 includes processing capability in the form of processors 121, storage capability including system memory 134 and mass storage 124, input means such as keyboard 129 and mouse 130, and output capability including speaker 131 and display 135. In one embodiment, a portion of system memory 134 and mass storage 124 collectively store an operating system coordinate the functions of the various components shown in FIG. 1.

Figure 2:
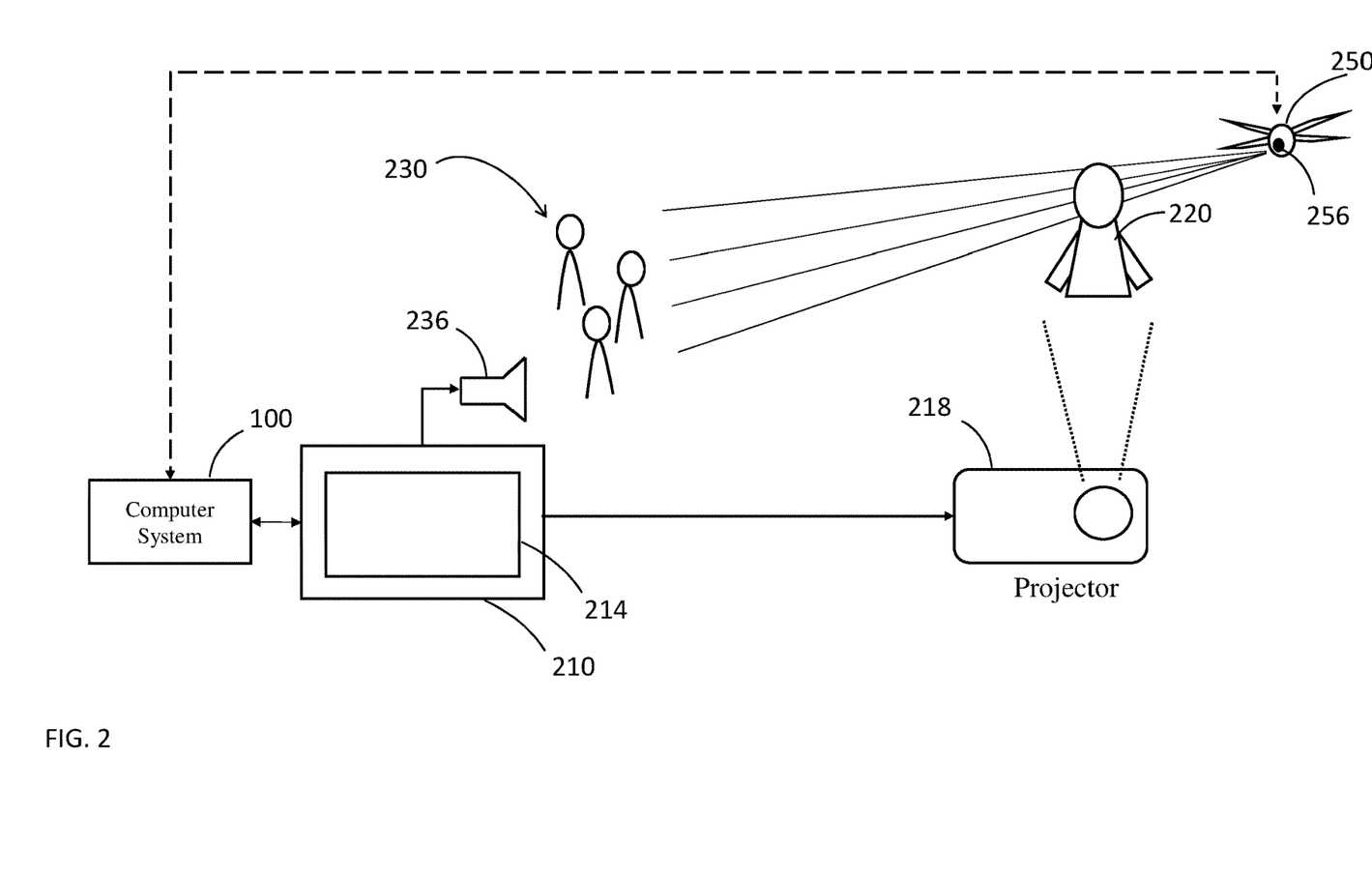
FIG. 2 is a block diagram illustrating audio management for a holographic object in a first position according to one or more embodiments of the present invention.

Referring to FIG. 2, the computer system 100 communicates with one or more holographic systems 210. Each holographic system 210 includes a holographic apparatus 214 and a holographic projector 218. In FIG. 2 the projector 218 may emit laser light or other coherent light suitable for generating a first holographic object 220 visible to a spectator or an audience 230 of one or more audience members. In some embodiments, the holographic system 210 may retain a static speaker 236. The holographic system 210 also includes the computer system 100 for controlling the holographic apparatus 214 when generating the holographic object 220 with the projector 218. Although FIG. 2 shows the computer system 100 and the holographic apparatus 214 as being separate, the computer system 100 may also be part of one or more holographic systems 200.

The computer system 100 also communicates with one or more autonomous aerial vehicles (AAVs) 250. The AAV 250 is a remote controlled vehicle including, but not limited to, an aircraft, glider or a balloon in communication with a ground-based controller such as the computer system 100. However, in one or more embodiments, the AAV 250 may have an autonomous onboard computer performing all or part of the functioning of computer system 100.

The computer system 100 operates as a remote control system for controlling the AAV 250. The computer system 100 is paired with the AAV 250 which includes a remote control receiver for communicating with the computer system 100. The computer system 100 controls the positioning of the holographic object 220 and, therefore, can use the position of the holographic object 220 to position the AAV 250. Each AAV 250 has a control system for controlling the flight of the AAV 250. The AAV 250 may also include a navigation system and obstacle detection and collision avoidance technologies.

Figure 3:
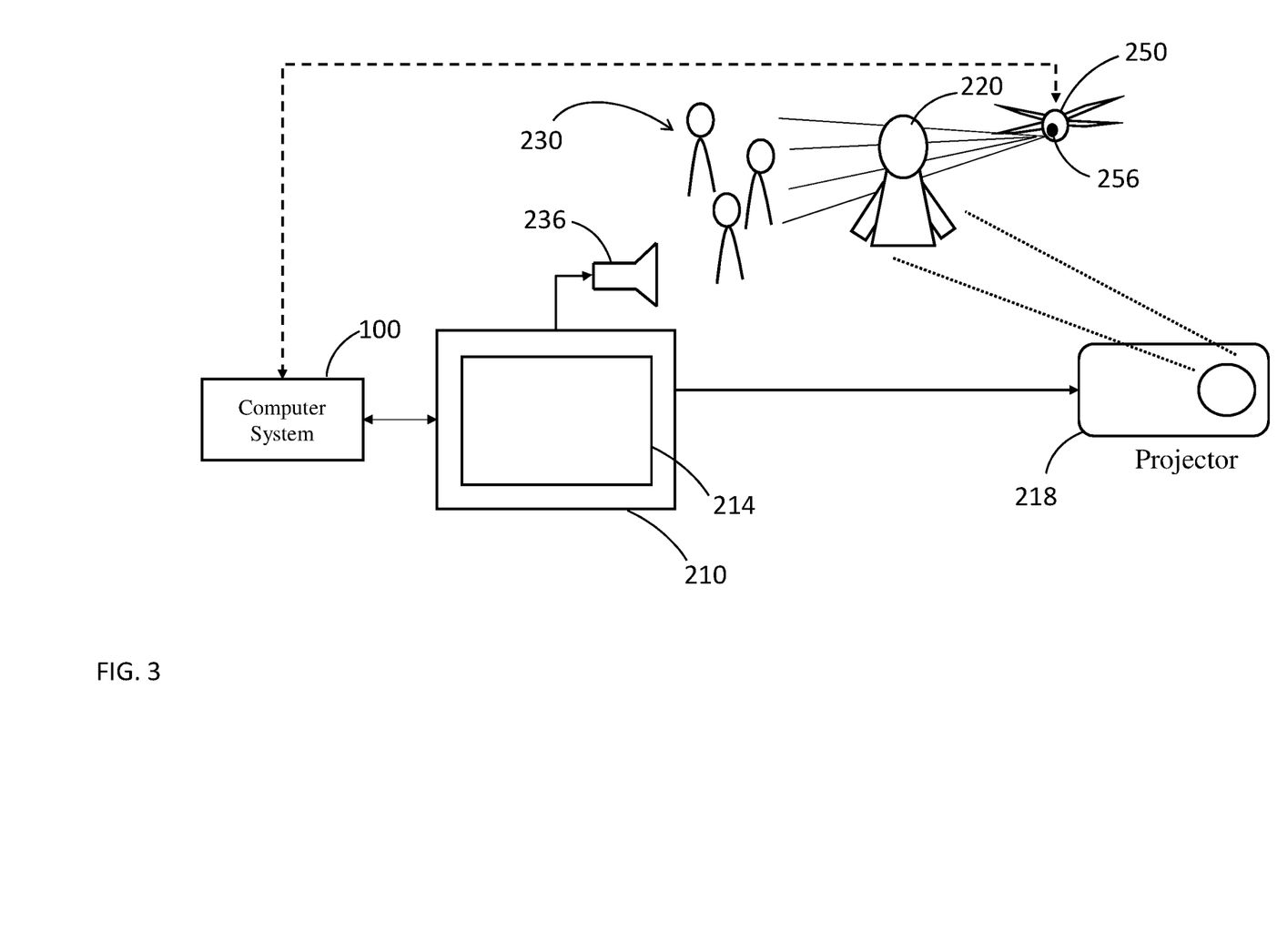
FIG. 3 is a block diagram illustrating audio management for the holographic object of FIG. 2 in a second position according to one or more embodiments of the present invention.

The AAV 250 also includes one or more speakers 256 such as a wireless speaker for receiving audio signals preferably using radio frequency (RF) waves, rather than audio cables, such as WiFi or Bluetooth. Thus, the audio for the holographic object 220 is provided by the computer system 210 via the speaker 256 of the AAV 250. The position of the holographic object 220 can be determined by the computer system 100 and then the computer system 100 can instruct the AAV 250 to fly into proximity of the holographic object 220, or into the holographic object 220 itself, to provide the sound from the speaker 256. The AAV 250 is preferably positioned such that the sound generated from the speaker 256 is perceived by the audience 230 to come from the holographic object 220. As the projection of the holographic object 220 moves from a first position as shown in FIG. 2 to a second position as shown in FIG. 3, the instructions from the computer system control the flight of the AAV 250 such that the AAV 250 mirrors the movement of the holographic object 220 and the audio pans from the first position to the second position. A plurality of AAVs 250 could mirror or track in close proximity the movement of a plurality of holographic objects 220.

Unbeknownst to the audience 230, the AAV 220, providing the sound for the holographic object 220 remains behind or inside the holographic object 220 as the holographic object 220 moves. In other words, the audience 230 perceives that sound is coming directly from the holographic object 220 but cannot see the flying AAV 250 itself, even though the AAV 250 is in the same line of sight as the moving holographic object 220 because it is obscured from view by the holographic object 220. In one or more embodiments, the outer surfaces of the AAV 250 may be mirrored in order to help obscure the AAV 250 from view.

Figure 4:
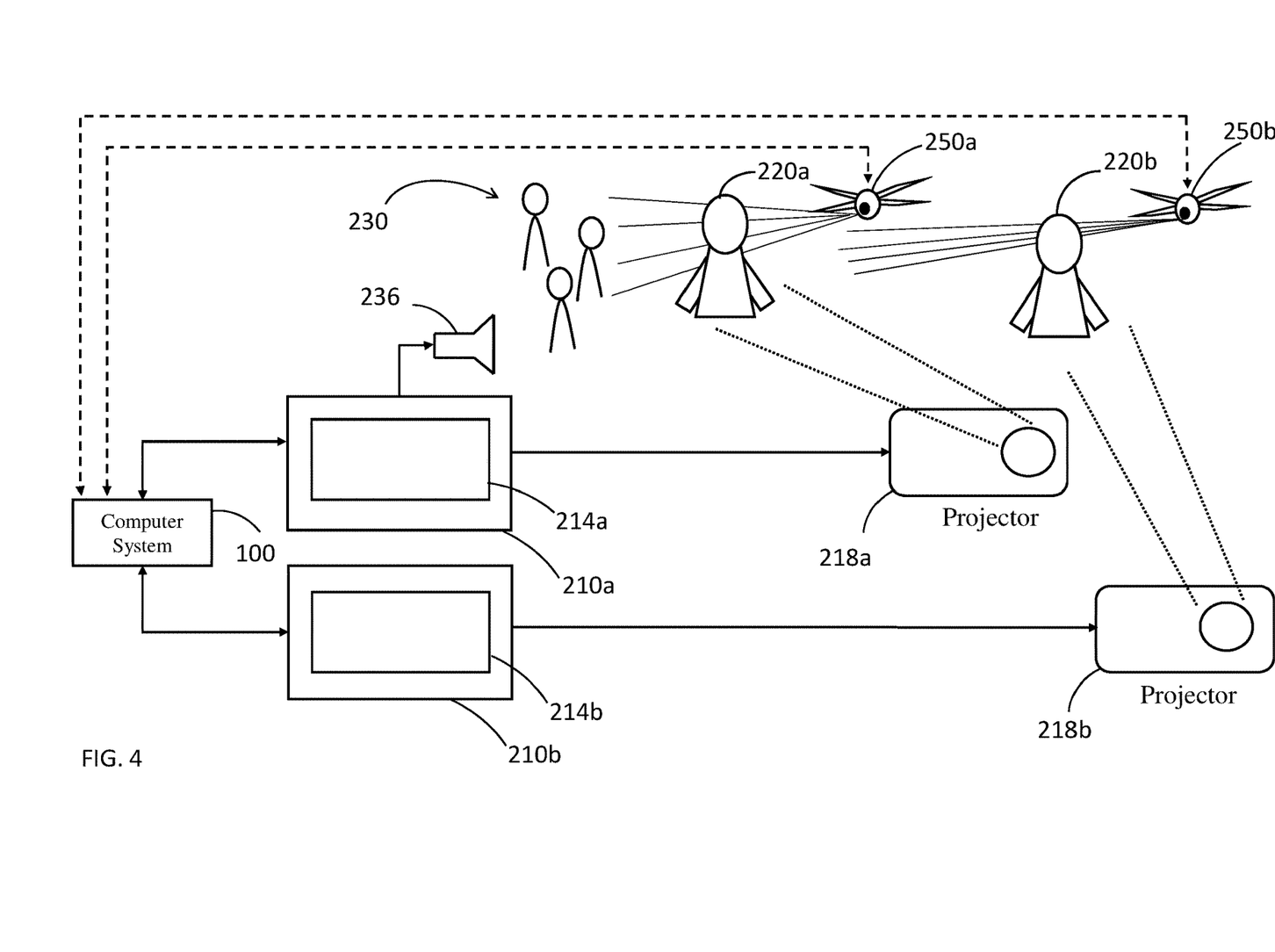
FIG. 4 is a block diagram illustrating audio management for a pair of holographic objects according to one or more embodiments of the present invention.

Referring now to FIG. 4, the computer system 100 is configured to communicate with two holographic systems 210a, 210b having holographic apparatuses 214a, 214b and projectors 218a, 218b. FIG. 4 depicts, in particular, two AAVs 250a, 250b providing sound for two holographic objects 220a, 220b. The AAV 250a provides the sound for the holographic object 220a and the AAV 250b provides the sound for the holographic object 220b.

In the event of movement by either one or both of the holographic objects 220a, 220b, the AAVs 250a, 250b may also move. For example, when moving at least one of the first and second holographic objects 220a, 220b to another position, in response, the first AAV 250a then provides sound for the second holographic object 220b. In such case, the second AAV 250b could then provide sound for the holographic object 220a.

Figure 5:
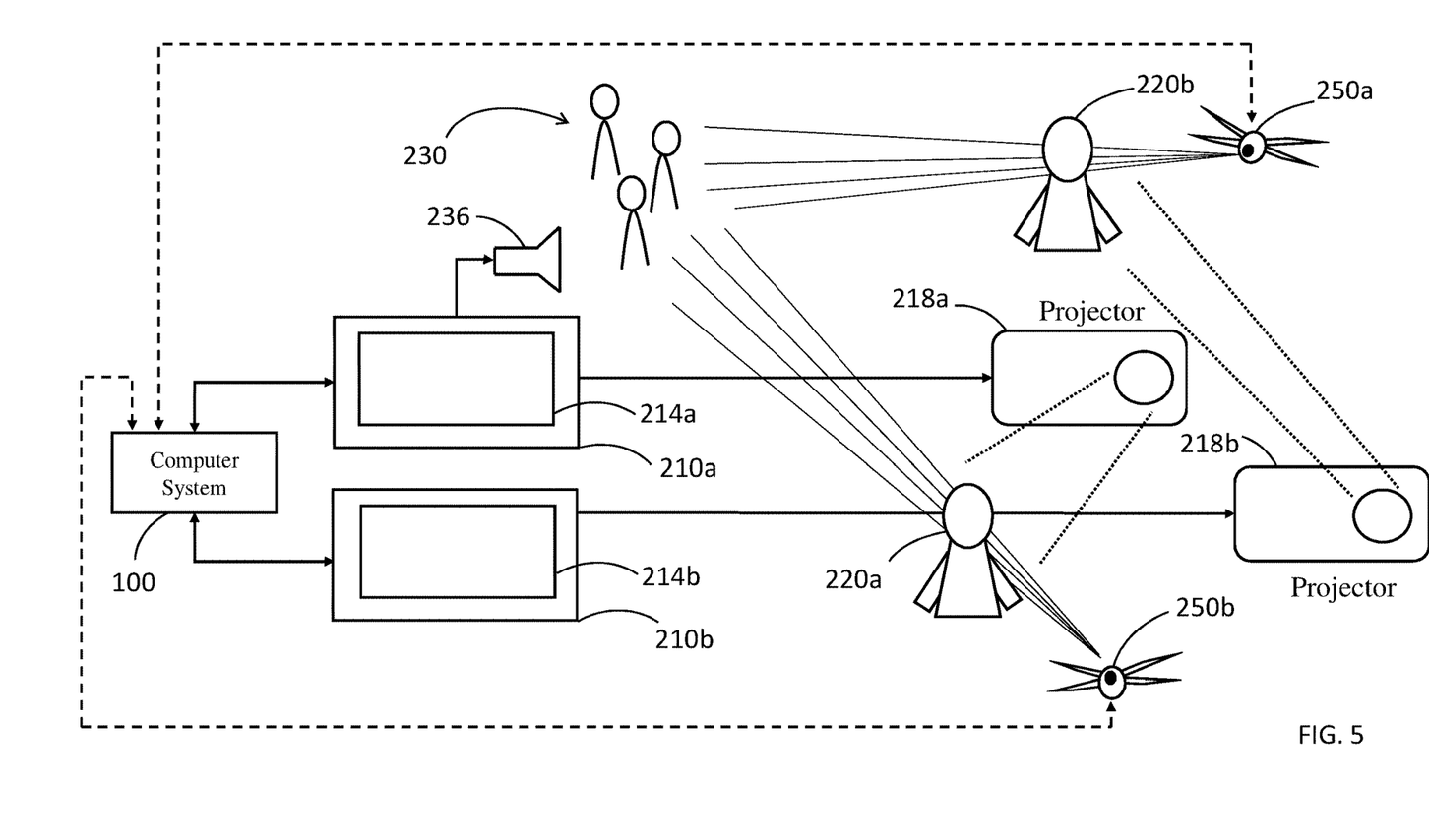
FIG. 5 is a block diagram illustrating audio management for the pair of holographic objects of FIG. 4 in different positions according to one or more embodiments of the present invention.

In one or more other embodiments, both of the holographic objects 220a, 220b may move to different positions. For example, sound is provided from the AAV 250a for the holographic object 220a via flight into the first position as shown in FIG. 4 and, when the holographic object 220a moves into a second position as shown in FIG. 5, the sound is then provided from the second AAV 250b for the holographic object 220a via flight into the second position. Thus, sound for the holographic objects 220a, 220b in FIG. 4 is provided by different AAVs 250a, 250b in FIG. 5.

In other words, the AAV 250 provided sound for the holographic object 220 in the first and second positions as shown in FIGS. 2 and 3. After a second holographic object 220b appeared as shown in FIG. 4, the second AAV 250b then provided sound for the holographic object 220a as a result of movement of the holographic object 220a into a third position as shown in FIG. 5.

Figure 6:
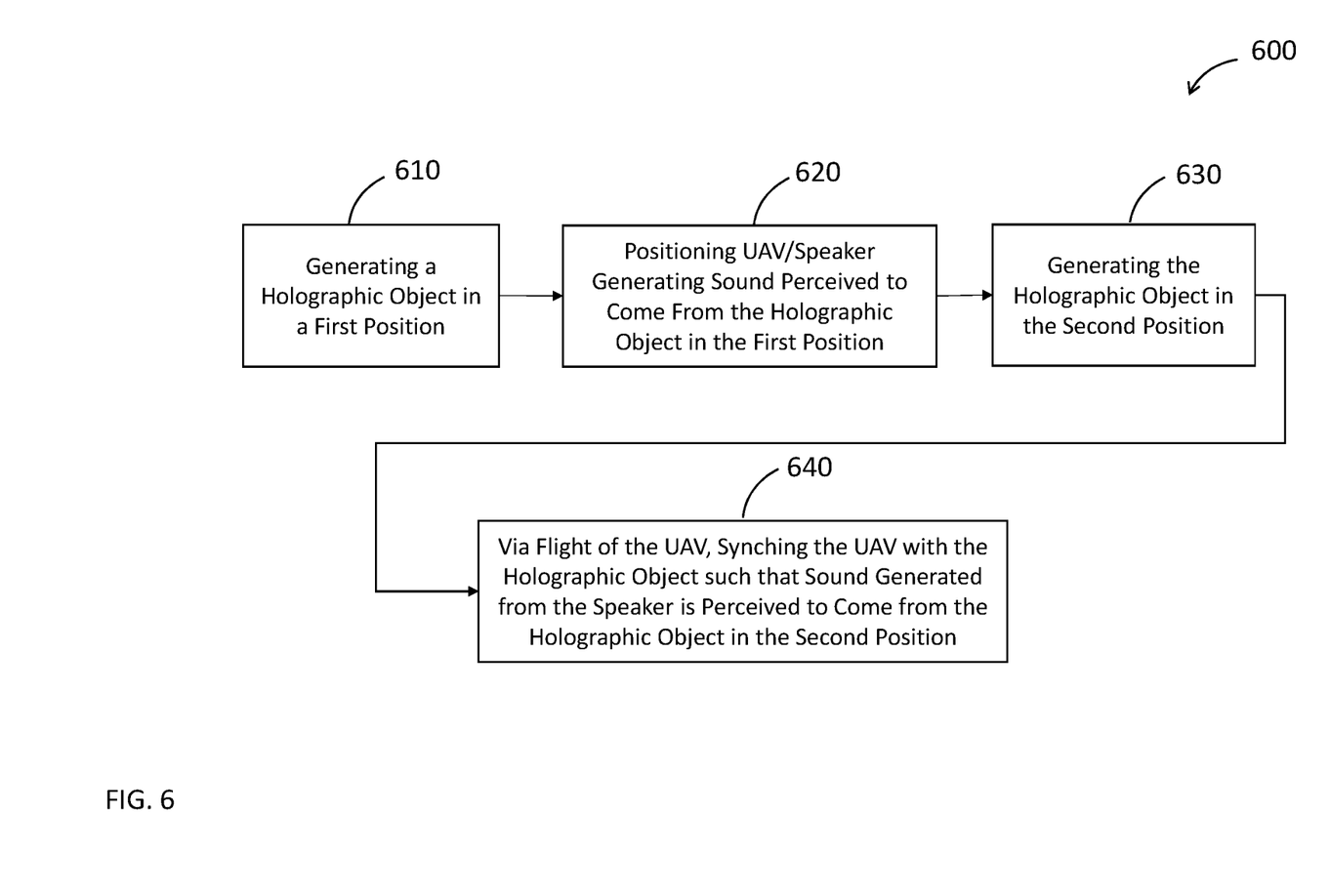
FIG. 6 is a flow diagram illustrating a method for synchronizing sound for moving holographic objects according to one or more embodiments of the present invention.

Turning to FIG. 6, one or more embodiments may include a method 600 for synchronizing sound for moving holographic objects. The flow diagram of FIG. 6 illustrates the method 600 that includes process block 610 for generating a holographic object in a first position. At process block 620 the method 600 includes positioning at least one AAV having at least one speaker such that the speaker generates sound perceived to come from the holographic object in the first position. The method 600 also includes process block 630 for generating the holographic object in the second position and processing block 640 for, via flight of the AAV, synchronizing the AAV with the holographic object such that the sound generated from the speaker is perceived to come from the holographic object in the second position. In other words, during a holographic object's movement from one position to another, the flight of the AAV is reoriented such that sound generated from the speaker of the AAV is perceived to come from the holographic object while moving and while in the other position.

Various technical benefits are achieved using the system and methods described herein, including the capability of providing enhanced performance for applications with exclusive access to the co-processors while also allowing applications that do not need performance access to accelerators when shared access is available. In this manner, the computer system can realize performance gains through the use of co-processors in the system, thereby improving overall processing speeds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of synchronizing sound with a moving holographic object, the method comprising:
   generating a holographic object in a first position;
   positioning at least one autonomous aerial vehicle (AAV) comprising at least one speaker such that the speaker generates sound perceived to come from the holographic object in the first position;
   generating the holographic object in a second position; and
   via flight of the AAV, synchronizing the AAV with the holographic object such that the sound generated from the speaker is perceived to come from the holographic object in the second position.

2. The method of claim 1 wherein the flight of the AAV mirrors movement of the holographic object.

3. The method of claim 1 further comprising determining a position of the holographic object.

4. The method of claim 3 wherein the flight of the AAV comprises the AAV flying into the holographic object.

5. The method of claim 1 wherein the at least one AAV is a plurality of AAVs and wherein the sound is provided from a first AAV for the holographic object via flight into the first position and wherein the sound is provided from a second AAV for the holographic object via flight into the second position.

6. The method of claim 1, wherein the holographic object is a first holographic object and the at least one AAV is a plurality of AAVs, further comprising a first AAV providing sound for the first holographic object in the first position and a second AAV provides sound for a second holographic object.

7. The method of claim 6 further comprising moving at least one of the first and second holographic objects to another position and, in response, the first AAV then provides sound for the second holographic object.

8. The method of claim 7 further comprising the second AAV providing sound for the holographic object.

9. The method of claim 1 wherein the AAV is mirrored.

10. A system for synchronizing sound with moving holographic objects, comprising:
    at least a first holographic system comprising a projector projecting a first holographic object in a first position and subsequently projecting the first holographic object in a second position; and
    at least a first autonomous aerial vehicle (AAV) comprising a speaker generating sound for holographic objects, the first AAV in communication with the first holographic system for determining positioning of the first holographic object;
    wherein the positioning of the first AAV via flight synchronizes the speaker of the AAV in the first and second positions such that sound is perceived to come from the first holographic object when in each of the first and second positions.

11. The system of claim 10 wherein the positioning of the first AAV mirrors movement of the first holographic object between the first and second positions.

12. The system of claim 10 wherein the first AAV flies into the first holographic object at the first and second positions.

13. The system of claim 10 further comprising a second AAV and a second holographic object, wherein sound is provided from the first AAV for the first holographic object in the first position and sound is provided from the second AAV for the second holographic object.

14. The system of claim 13 wherein the second AAV provides sound for the first holographic object in a third position.

15. The system of claim 10 wherein the first AAV is mirrored.

16. A computer program product comprising a computer readable storage medium having program instructions embodied therewith, the program instructions executable by a computer processor to cause the computer processor to perform a method, comprising:
    generating via a holographic system a holographic object in a first position;
    communicating with at least one autonomous aerial vehicle (AAV) to generate sound perceived to be from the holographic object in the first position;
    generating the holographic object in a second position; and
    in response to the holographic object being projected in the second position, repositioning the AAV via flight and generating sound perceived to be from the holographic object in the second position.

17. The computer program product of claim 16 comprising determining positioning of the holographic object and flying the AAV into the holographic object at the first and second positions.

18. The computer program product of claim 16 further comprising generating a second holographic object and communicating with a second AAV to generate sound perceived to come from the second holographic object.

19. The computer program product of claim 18, wherein the holographic object is a first holographic object, further comprising the second AAV generating sound for the first holographic object in a third position.

20. The computer program product of claim 16 further comprising communicating with a plurality of AAVs and the AAVs mirroring a plurality of holographic objects.

* * * * *